United States Patent
Chu et al.

(10) Patent No.: US 8,085,134 B2
(45) Date of Patent: Dec. 27, 2011

(54) WIRELESS SENSOR NETWORK AND SAMPLING RATE ALLOCATION METHOD THEREOF

(75) Inventors: Tsung-Hsien Chu, Taipei (TW); Huang-Yi Yu, Taipei County (TW); Po-Nung Chiang, Chiayi County (TW); Tai-Yi Huang, Taipei (TW); Chung-Chou Shen, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 581 days.

(21) Appl. No.: 12/251,403

(22) Filed: Oct. 14, 2008

(65) Prior Publication Data
US 2009/0251297 A1 Oct. 8, 2009

(30) Foreign Application Priority Data
Apr. 8, 2008 (TW) ................. 97112699 A

(51) Int. Cl.
*G08B 9/00* (2006.01)
*H04L 12/42* (2006.01)
*H04L 12/43* (2006.01)
*H04W 4/00* (2009.01)
*G08C 15/00* (2006.01)
*H04B 7/185* (2006.01)
*H04M 1/00* (2006.01)

(52) U.S. Cl. ............... 340/286.02; 370/447; 370/458; 370/328; 370/238; 370/318; 455/574

(58) Field of Classification Search .......... 340/286.02; 370/447, 458, 328; 455/574
See application file for complete search history.

(56) References Cited

U.S. PATENT DOCUMENTS

| | | | |
|---|---|---|---|
| 6,987,738 B2 * | 1/2006 | Subramanian et al. | 370/252 |
| 7,020,501 B1 | 3/2006 | Elliott et al. | |
| 7,336,930 B2 * | 2/2008 | Larsson et al. | 455/63.1 |
| 2002/0071395 A1 * | 6/2002 | Redi et al. | 370/252 |
| 2004/0100917 A1 * | 5/2004 | Perkins et al. | 370/311 |
| 2005/0078672 A1 * | 4/2005 | Caliskan et al. | 370/389 |
| 2006/0206857 A1 | 9/2006 | Liu et al. | |
| 2006/0229017 A1 * | 10/2006 | Larsson et al. | 455/63.1 |
| 2007/0058664 A1 | 3/2007 | Kim et al. | |
| 2008/0253327 A1 * | 10/2008 | Kohvakka et al. | 370/330 |
| 2009/0016314 A1 * | 1/2009 | Kim | 370/345 |
| 2009/0129316 A1 * | 5/2009 | Ramanathan et al. | 370/328 |

FOREIGN PATENT DOCUMENTS
EP 1560370 8/2005
* cited by examiner

*Primary Examiner* — George Bugg
*Assistant Examiner* — Jack Wang
(74) *Attorney, Agent, or Firm* — Jianq Chyun IP Office

(57) ABSTRACT

A sampling rate allocation method for a wireless sensor network is provided. In this method, a distributed computing method is adopted to allow each node to calculate and obtain its decision table and energy table and upload its energy table to its parent node, and finally, the number of samples to be provided by all the child nodes is determined according to the decision table of the root node and a total sample number. Compared to the conventional techniques, the present invention provides a wireless sensor network which has longer life time and can meet the requirements to both the total number of samples and the fairness.

27 Claims, 7 Drawing Sheets

| node | $e_i$ | $\alpha_{i,0}$ | $\alpha_{i,1}$ | $\alpha_{i,5}$ | $\beta_i$ | $\gamma_i$ |
|------|-------|----------------|----------------|----------------|-----------|------------|
| $S_1$ | 200 | 10 | ∞ | ∞ | 10 | 10 |
| $S_2$ | 150 | ∞ | 20 | ∞ | 10 | 10 |
| $S_3$ | 130 | ∞ | 10 | ∞ | 10 | 10 |
| $S_4$ | 130 | ∞ | 20 | ∞ | 10 | 10 |
| $S_5$ | 155 | 10 | ∞ | ∞ | 10 | 15 |
| $S_6$ | 135 | ∞ | ∞ | 5 | 10 | 5 |
| $S_7$ | 130 | ∞ | ∞ | 10 | 10 | 5 |

WIRELESS SENSOR NETWORK AND SAMPLING RATE ALLOCATION METHOD THEREOF

CROSS-REFERENCE TO RELATED APPLICATION

This application claims the priority benefit of Taiwan application serial no. 97112699, filed on Apr. 8, 2008. The entirety of the above-mentioned patent application is hereby incorporated by reference herein and made a part of specification.

BACKGROUND OF THE INVENTION

1. Field of the Invention

The present invention generally relates to a wireless sensor network and a sampling rate allocation method thereof, in particular, to a wireless sensor network which has long life time and meets the requirements to both total sample number and fairness, and to a sampling rate allocation method thereof.

2. Description of Related Art

A wireless sensor network is composed of a plurality of wireless sensors, and which can be used for environment monitoring by periodically sensing various samples (for example, temperature, humidity, sound, radio frequency, and atmospheric pressure) via these wireless sensors. The number of samples sensed by the wireless sensors in a specific time interval is referred as sampling rate. In addition, besides being applied to environment monitoring, a wireless sensor network may also be applied to various aspects in our daily life or industrial processes, such as speech recognition, object localization, and system modeling etc.

FIG. 1 is a schematic diagram of a wireless sensor network 10. Referring to FIG. 1, the wireless sensor network 10 includes a plurality of nodes 100, 101, ..., 107 and a host 108, wherein the nodes 100, 101, ..., 107 and the host 108 are connected to each other and communicate through radio wave or infrared light so as to send sensed samples and parameters for allocating the sampling rate. The nodes 100, 101, ..., 107 and the host 108 may have sensors for obtaining samples; however, some of the nodes 100, 101, ..., 107 or the host 108 may have no sensor but simply receive and send samples (P.S. the host 108 does not send samples). The nodes 100, 101, ..., 107 of the wireless sensor network 10 may be wireless communication units with sensors, and the host 108 may be referred as a root node. The host 108 receives and analyzes samples sensed by each of the nodes 100, 101, ..., 107.

The quality of samples sensed by the wireless sensor network 10 is related to the total number of samples and the source of the samples. Generally speaking, to ensure the reliability of the samples sensed by the wireless sensor network 10, the total number of samples in a specific time interval is increased and different sampling rates are allocated regarding to the significances of different nodes, so as to meet the requirements to both total sample number and fairness. However, an over-large total sample number won't increase the quality of the sensed samples drastically. To truthfully reconstruct the monitored phenomenon, the sampling rate of the wireless sensor network must be at least twice the highest frequency of the original signal, according to the Nyquist-Shannon sampling theorem (Refer to A. J. Jerri, "The Shannon Sampling Sheorem—Its Various Extensions and Applications: A Tutorial Review.", Proceedings of the IEEE, 65(11):1565-1596, 1977.). Taking a sound capturing system as an example, the quality of the samples is not increased obviously when the total number of samples is about 3000 samples per second.

The life time of the wireless sensor network 10 refers to the time when the energy of a particular node (one of the nodes 101~107) is used up, and the monitored phenomenon cannot be reconstructed. Generally speaking, the sampling rate of the node is related to the life time of the wireless sensor network. This is because that the energy of a node is consumed whenever the node senses, sends, or receives a sample. Accordingly, the more samples the node senses, sends, or receives, the more energy of this node will be consumed, and which will shorten the life time of the entire wireless sensor network 10. Thus, the higher sampling rate a node has, the shorter the life time of the node is. The sampling rate of a node is increased along with the total number of samples. As a result, over sampling cannot increase the quality and reliability of the samples; instead, additional energy is consumed and the life time of the wireless sensor network 10 is even shortened.

Several sampling rate allocation methods for wireless sensor networks have been disclosed in U.S. Patent No. 20060206857, U.S. Patent No. 20070058664, U.S. Pat. No. 7,002,501, European Patent. No. 20050250440, and some other articles. According to these methods, a host is allowed to receive the most samples before the energy of a node is used up first. However, in these methods, the samples may all come from some particular nodes and induce bias in data analysis. According to these methods, nodes having more energy are used for sensing more samples so that the life time of the wireless sensor network can be prolonged. However, in the worst case, all the samples may come from the same node, and since the samples obtained from the same node cannot represent the characteristic of the entire network, analysis error may be caused. A host should be able to receive samples from different nodes so as to avoid bias in data analysis.

Articles for providing foregoing methods include: [1] J. H. Chang and L. Tassiulas, "Maximum lifetime routing in wireless sensor networks," IEEE Trans. on Networking., vol. 12, no. 4, pp. 609-619, August 2004. [2] J. Park and S. Sahni, "An Online Heuristic for Maximum Lifetime Routing in Wireless Sensor Netzvorks," IEEE/ACM Transactions on Networking, 12(4):609-619, 2004. [3] K. Kar, M. Kodialam, T. V. Lakshman, and L. Tassiulas., "Routing for Network Capacity Maximization in Energy-constrained Ad-hoc Networks," In INFOCOM '03: Twenty-Second Annual Joint Conference of the IEEE computer and Communications Societies, pages 673-681. IEEE Press, 2003. [4] Madan, R. Lall, S., "Distributed Algorithms for Maximum Lifetime Routing in Wireless Sensor Networks," IEEE Transaction on Wireless Communications, 5(8):2185-2193, 2006. [5] A. Sankar and Z. Liu., "Maximum Lifetime Routing in Wireless Ad-Hoc Networks," In INFOCOM '04: Twenty-Third Annual Joint Conference of the IEEE computer and Communications Societies, pages 1089-1097. IEEE Press, 2004.

In addition, another type of sampling rate allocation methods is disclosed in some other articles. According to these methods, a utility function is allocated to each node, wherein the value of the utility function increases along with the sampling rate of the node, and the increment thereof is reduced along with the increasing of the sampling rate. In these methods, the sampling rate of each node is allocated such that the total value of the utility functions of all these nodes can be maximized before a node runs out of its energy. Through these methods, the problem of lack of fairness in foregoing patents and articles can be resolved; however, a host may not be able to receive enough number of samples, namely, the requirement of total sample number cannot be met.

Articles for providing foregoing methods include: [1] Y. Cui, Y. Xue, and K. Nahrstedt, "*A Utility-based Distributed Maximum Lifetime Routing Algorithm for Wireless Networks*," in IEEE Transactions on Vehicular Technology, 55(3):797-805, 2006. [2] Y. T. Hou, Y. Shi, and H. D. Sherali, "*Rate allocation in wireless sensor networks with network lifetime requirement*," in Proceedings of ACM International Symposium on Mobile Ad Hoc Networking and Computing (MobiHoc), pp. 67-77, May 24-26, 2004, Tokyo, Japan. [3] V. Srinivasan, C. F. Chiasserini, P. Nuggehalli, and R. R. Rao., "*Optimal Rate Allocation for Energy Efficient Multipath Routing in Ad Hoc Wireless Net-works*," IEEE Transactions on Wireless Communications, Vol. 3, May 2004. [4] J. H. Zhu, Shan Chen, B. Bensaou, and K. L. Hung, "*Tradeoff between Lifetime and Rate Allocation in Wireless Sensor Networks: A Cross Layer Approach*," in IEEE INFOCOM 2007, May 2007.

In short, even though the sampling rate allocation methods disclosed in foregoing patents and articles can prolong the life time of the entire wireless sensor network, they cannot meet the quantity and fairness requirements. In addition, the collected samples may not be able to reconstruct the monitored phenomenon.

SUMMARY OF THE INVENTION

Accordingly, the present invention is directed to a wireless sensor network and a sampling rate allocation method thereof. In the sampling rate allocation method of the wireless sensor network, a distributed computing method is adopted so that the wireless sensor network in tree topology can have prolonged life time and can meet both the quantity and fairness requirements.

The present invention provides a wireless sensor network including a root node, at least one internal node, and a plurality of leaf nodes. An internal node is a node having child nodes in the wireless sensor network, so it is not a leaf node. The root node sends a total sample number to the internal node and the leaf nodes, wherein the total number of samples is the number of samples to be sensed by the wireless sensor network within a specific time. Each leaf node calculates its remaining energy thereof after providing a sample and generates a first calculation result, and the leaf node uploads the first calculation result to the internal node. The internal node generates a second calculation result and a third calculation results based on these first calculation results and uploads the second calculation result and the third calculation result to the root node. The root node generates a fourth calculation result and a fifth calculation result based on the second calculation result. After that, the root node determines the number of samples to be sent by the internal node to the root node within the specific time according to the fifth calculation result and the total number of samples. Finally, the internal node determines the number of samples to be sensed by the internal node and the leaf nodes within the specific time according to the number of samples to be sent to the root node and the third calculation result.

According to an embodiment of the present invention, the first calculation results are energy tables of the leaf nodes, the second calculation result and the third calculation result are respectively an energy table and a decision table of the internal node, and the fourth calculation result and the fifth calculation result are respectively an energy table and a decision table of the root node.

The present invention provides a wireless sensor network including a root node and a plurality of leaf nodes. The root node sends a total sample number to the leaf nodes, wherein the total number of samples is the number of samples to be sensed by the wireless sensor network within a specific time. Each leaf node calculates its remaining energy thereof after providing a sample and generates a first calculation result, and the leaf node uploads the first calculation result to the root node. The root node generates a second calculation result and a third calculation result based on these first calculation results. After that, the root node determines the number of samples to be sensed by the leaf nodes within the specific time according to the third calculation result and the total number of samples.

According to an embodiment of the present invention, the first calculation results are energy tables of the leaf nodes, and the second calculation result and the third calculation result are respectively an energy table and a decision table of the root node.

The present invention provides a sampling rate allocation method, wherein the sampling rate allocation method is suitable for a wireless sensor network in tree topology. The wireless sensor network includes a root node, at least one internal node, and a plurality of leaf nodes. Steps of the method are described as follows. First, the root node sends a total sample number to the internal node and each of the leaf nodes, wherein the total number of samples is the number of samples to be sensed by the wireless sensor network within a specific time. Then, each leaf node calculates its remaining energy thereof after providing a sample and generates a first calculation result, and the leaf node uploads the first calculation result to the internal node. Next, the internal node generates a second calculation result and a third calculation result based on the first calculation results and uploads the second calculation result to the root node. After that, the root node generates a fourth calculation result and a fifth calculation result based on the second calculation result. Next, the root node determines the number of samples to be sent by the internal node to the root node within the specific time according to the fifth calculation result and the total number of samples. Finally, the internal node determines the number of samples to be sensed by the internal node and the leaf nodes within the specific time according to the number of samples to be sent to the root node and the third calculation result.

According to an embodiment of the present invention, the first calculation results are energy tables of the leaf nodes, the second calculation result and the third calculation result are respectively an energy table and a decision table of the internal node, and the fourth calculation result and the fifth calculation result are respectively an energy table and a decision table of the root node. The decision table of the root node records the mapping between the total number of samples and the number of samples to be provided by the internal node to the root node, and the decision table of the internal node records the mapping between the number of samples to be uploaded by the internal node to the root node within the specific time and the number of samples to be sensed by the internal node and the leaf nodes.

The present invention provides a sampling rate allocation method, wherein the sampling rate allocation method is suitable for a wireless sensor network in tree topology. The wireless sensor network includes a root node and a plurality of leaf nodes. Steps of the method are described as follows. First, the root node sends a total sample number to each of the leaf nodes, wherein the total number of samples is the number of samples to be sensed by the wireless sensor network within a specific time. Next, Each leaf node calculates its remaining energy thereof after providing a sample and generates a first calculation result, and the leaf node uploads the first calculation result to the root node. Then, the root node generates a second calculation result and a third calculation result based on the first calculation results. Finally, the root node determines the number of samples to be sensed by the leaf nodes within the specific time according to the third calculation result and the total number of samples.

According to an embodiment of the present invention, the first calculation results are energy tables of the leaf nodes, the second calculation result and the third calculation result are respectively an energy table and a decision table of the root node, and the decision table of the root node records the mapping between the total number of samples and the number of samples to be sensed by the leaf nodes.

The present invention provides a wireless sensor network and a sampling rate allocation method thereof, wherein a distributed computing method is adopted so that the wireless sensor network in tree topology can prolong the network life time and meet both the quantity and fairness requirements. Thereby, both the cost for replacing node batteries and the volume of the batteries (for example, solar cells) can be reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
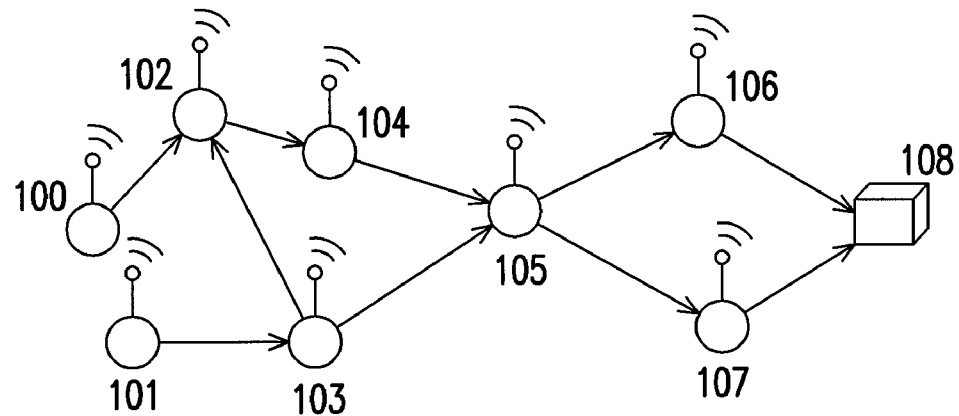
FIG. 1 is a schematic diagram of a wireless sensor network 10.

Reference will now be made in detail to the present preferred embodiments of the invention, examples of which are illustrated in the accompanying drawings. Wherever possible, the same reference numbers are used in the drawings and the description to refer to the same or like parts.

The present invention provides a wireless sensor network and a sampling rate allocation method thereof. In the sampling rate allocation method, a sampling rate is allocated to each node in the wireless sensor network, and the wireless sensor network has longer life time and can meet both the quantity and fairness requirements.

[System Model of Wireless Sensor Network]

Figure 2:
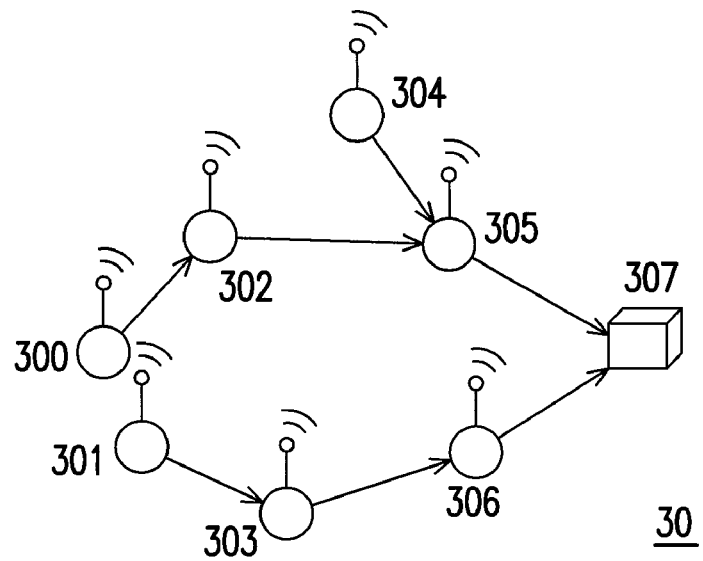
FIG. 2 is a schematic diagram of a wireless sensor network 30 in tree topology.

FIG. 2 is a schematic diagram of a wireless sensor network 30 in tree topology. Referring to FIG. 2, the wireless sensor network 30 includes a plurality of nodes 300, 301, ..., 306 and a host 307. The nodes 300, 301, and 304 are leaf nodes in the tree topology, and the leaf nodes 300, 301, and 304 respectively have a sensor. The other nodes 302, 303, 305, and 306 are internal nodes, and the internal nodes 302, 303, 305, and 306 may have sensors or may have no sensor but only used for sending and receiving data. The nodes having sensors are referred as source nodes and which can be used for capturing samples (for example, humidity, temperature, pressure, and radio frequency etc) required by the host 307. The host 307 is the root node in the tree topology and which is used for receiving data from each node and analyzing the samples received from each node.

[Definition of Notations]

Herein, a critical node is defined as the node having the least energy among all the nodes in the wireless sensor network, and the energy thereof is referred as critical energy. The root node is denoted as $S_0$, and the other nodes are respectively denoted as $S_1, S_2, \ldots,$ and $S_n$. The transmission energy consumed for sending a sample from the node $S_i$ to the node $S_j$ is denoted as $\alpha_{i,j}$, the receiving energy consumed by the node $S_i$ for receiving a sample is denoted as $\beta_i$, the sensing energy consumed by the node $S_i$ for sensing a sample is denoted as $\gamma_i$, the total number of samples required by the root node $S_0$ in a specific time interval is denoted as R. and sampling rate sampling rate $x_i$ represents the number of samples sensed by the node $S_i$ within a specific interval T. The sampling rate of each node $S_i$ is limited in the range of $l_i$ and $u_i$, representing $x_i$'s minimum and maximum sampling rates. Because the specific interval T has a fixed value in embodiments of the present invention, the number of samples sensed by the node $S_i$ can be considered as the sampling rate $x_i$ in following description.

[Problem to be Resolved]

Within the specific interval T, the remaining energy of the node $S_i$ is denoted as $e_i'$ after the root node $S_0$ obtains R samples. The method for calculating the remaining energy of the node $S_i$ is:

$$e_i' = e_i - \gamma_i \times x_i - \sum_{j=0, j \neq i}^{n} \alpha_{i,j} \times z_{i,j} - \beta_i \times \sum_{k=1, k \neq i}^{n} z_{k,i}$$

wherein $e_i$ represents the original energy of the node $S_i$ before the node $S_i$ starts to sense samples, $\gamma_i \times x_i$ represents the consumed energy of the node $S_i$ after the node $S_i$ has sensed $x_i$ samples, $z_{i,j}$ represents the number of samples sent by the node $S_i$ to the node $$S_j, \sum_{j=0, j \neq i}^{n} \alpha_{i,j} \times z_{i,j}$$

represents the energy consumed by the node $S_i$ for sending the samples, and $$\beta_i \times \sum_{k=1, k \neq i}^{n} z_{k,i}$$

represents the energy consumed by the node $S_i$ for receiving samples. In addition, the number of samples sent by the node $S_i$ is equal to the sum of the number of samples sensed by the node $S_i$ and the number of samples received by the node $S_i$. Thus, $$x_i + \sum_{k=1, k \neq i}^{n} z_{k,i} = \sum_{j=0, j \neq i}^{n} z_{i,j}.$$

As defined above, the critical energy is the least one among the remaining energies $e_1'$, $e_2'$, ..., and $e_n'$. Thus, to prolong the life time of the entire wireless sensor network, the sampling rate $x_i$ has to be allocated appropriately so that the entire wireless sensor network can have the maximum critical energy. Foregoing issue can be expressed as:

Maximize $\min_{i=1,2,\ldots,n} e_i'$ subject to $\sum_{i=1}^{n} x_i = R$ $x_i + \sum_{k=1, k \neq i}^{n} z_{k,i} = \sum_{j=0, j \neq i}^{n} z_{i,j}$   $i, j = 0, 1, 2, \ldots, n$ $x_{l,i} \leq x_i \leq x_{u,i}$   $i = 0, 1, 2, \ldots, n$ $e_i' \geq 0, z_{j,i} \geq 0$   $i, j = 0, 1, 2, \ldots, n$ Accordingly, the essence of the problem is to determine the sampling rate $x_i$ of the node $S_i$ and the flow $z_{i,j}$ and $z_{k,i}$ of each node so as to have the maximum critical energy after the root node $S_0$ obtains R samples.

Those having ordinary knowledge in the art should be able to list all the combinations of the sampling rate $x_i$ and the remaining energy $e_i'$ of the node $S_i$ and find out the combinations which meet the requirements of both the total number of samples R and fairness, and furthermore, find out a combination among foregoing combinations which allows the wireless sensor network to have the longest life time. Such a method is very intuitive; however, it may require significant computation time to find out the optimal solution in large scale wireless sensor networks.

To resolve foregoing problem, in the sampling rate allocation method provided by the present invention, a distributed computing method is adopted to reduce the complexity of the calculation, and the optimal sampling rate $x_i$ of each node $S_i$ is obtained through table look-up.

[Definition of Energy Table and Decision Table]

As described above, in embodiments of the present invention, the sampling rate $x_i$ of each node $S_i$ is allocated through table look-up, and the concepts of energy table and decision table are defined herein. Each node records an energy table and a decision table besides that each leaf node only records an energy table.

Herein $E_i$ and $D_i$ are used for representing the energy table and the decision table of the node $S_i$. The energy table $E_i$ has R+1 rows, and each of the rows has a field, wherein the fields are denoted as $E_i[0]$~$E_i[R]$. The decision table $D_i$ has R+1 rows, and each of the rows has y+1 fields, wherein y represents the number of child nodes of the node $S_i$, and $E_i[j]$ is defined as the critical energy among $S_i$ and its sub-tree network after $S_i$ sends out j samples. In addition, some of the samples provided by the node $S_i$ within a specific time are from the child nodes of the node $S_i$ while some other samples provided by the node $S_i$ within the specific time are sensed by the node $S_i$. Thus, decision table $D_i[g,j]$ is used for representing the number of samples provided by the $j^{th}$ child node of the node $S_i$ when the node $S_i$ provides g samples to its parent node within the specific time, and here the node $S_i$ itself is considered the $0^{th}$ child node of the node $S_i$. Accordingly, when the node $S_i$ provides g samples to its parent node, the number of samples to be sensed by the node $S_i$ is $D_i[g,0]$, and the numbers of samples to be provided by the child nodes thereof are respectively $D_i[g,1]$, $D_i[g,2]$, $D_i[g,3]$, ..., and $D_i[g,y]$, wherein $D_i[g,j]$ meets the expression $D_i[g,0]+D_i[g,1]+D_i[g,2]+\ldots+D_i[g,y]=g$. Further, since a leaf node has no child node, it only records an energy table.

EXAMPLE 1

The foregoing method for allocating a sampling rate by using the energy table and the decision table for a wireless sensor network will be described below with reference to an example. However, this example is not intended for limiting the scope of the present invention.

Figure 3:
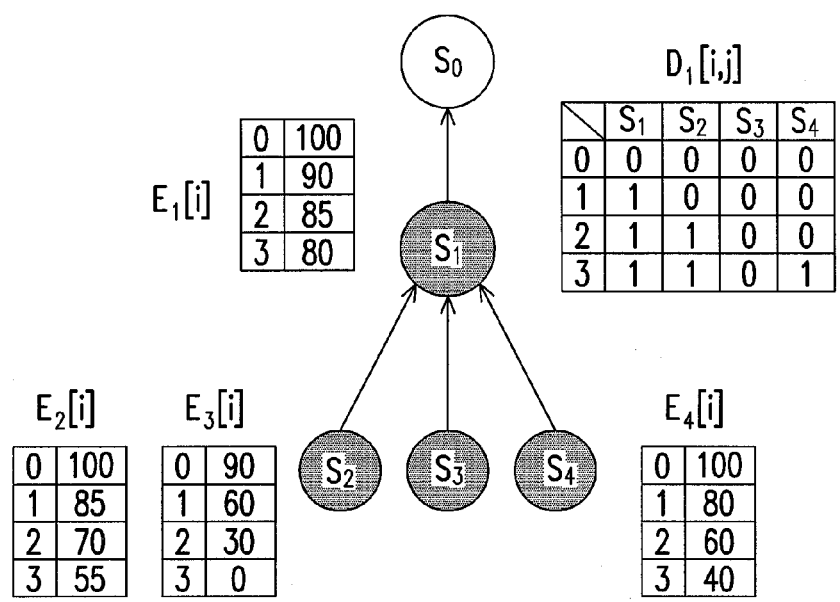
FIG. 3 is a schematic diagram of a wireless sensor network 50 in tree topology.
Figure 4:
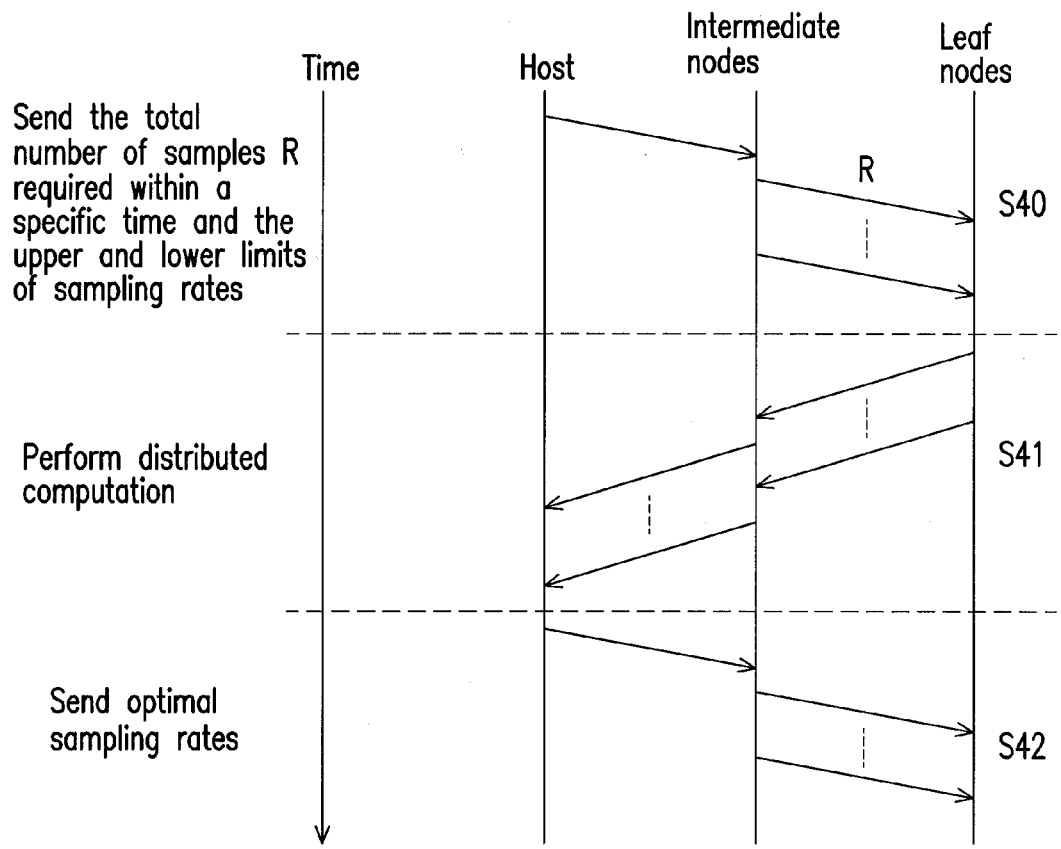
FIG. 4 is a flowchart of a sampling rate allocation method for a wireless sensor network according to an embodiment of the present invention.

FIG. 3 is a schematic diagram of the wireless sensor network 50, wherein the energy table or decision table of nodes $S_1$, $S_2$, $S_3$, and $S_4$ have been calculated. As shown in FIG. 4, the wireless sensor network 50 includes a root node $S_0$, an internal node $S_1$, and leaf nodes $S_2$~$S_4$. Referring to FIG. 3, $E_2[1]$ represents that the remaining energy of the node $S_2$ after it provides a sample is 85, $E_2[2]$ represents that the remaining energy of the node $S_2$ after it provides 2 samples is 70, and so on. The decision table $D_1$ represents the optimal sampling rate allocation of the internal node $S_1$ and its child nodes $S_2$~$S_4$. When the internal node $S_1$ needs to provides 3 samples to its parent node $S_0$, the optimal sampling rate allocation of the nodes $S_1$, $S_2$, $S_3$, and $S_4$ is $(x_1,x_2,x_3,x_4)=(D_1[3,0],D_2[3,1],D_3[3,2],D_4[3,3])=(1,1,0,1)$, and after the internal node $S_1$ provides the 3 samples, the critical energy among the nodes $S_1$, $S_2$, $S_3$, and $S_4$ is $E_1[3]=80$. Similarly, when the node $S_1$ needs to provide 2 samples to its parent node $S_0$, it can be understood based on the $2^{nd}$ row of the decision table $D_1$ that the optimal sampling rate allocation of the nodes $S_1$, $S_2$, $S_3$, and $S_4$ is $(x_1,x_2,x_3,x_4)=(D_1[2,0],D_2[2,1],D_3[2,2],D_4[2,3])=(1,1,0,0)$. After the node $S_1$ provides 2 samples, the critical energy among the nodes $S_1$, $S_2$, $S_3$, and $S_4$ is $E_1[2]=85$.

[Sampling Rate Allocation Method for Wireless Sensor Network]

FIG. 4 is the flowchart of the sampling rate allocation method for a wireless sensor network according to an embodiment of the present invention. This method is suitable for a wireless sensor network in tree topology. As described above, the wireless sensor network in tree topology includes a root node, a plurality of internal nodes, and a plurality of leaf nodes.

First, in step S40, the root node $S_0$ broadcasts a total sample number R and the upper limits $x_{u,1}, x_{u,2}, \ldots, x_{u,n}$ and lower limits $x_{l,1}, x_{l,2}, \ldots, x_{l,n}$ of the sampling rates $x_1, x_2, \ldots, x_n$ of the nodes $S_1, S_2, \ldots, S_n$ to all the nodes $S_1, S_2, \ldots, S_n$. It should be noted that even though in the present embodiment, the sampling rates $x_1, x_2, \ldots, x_n$ have their upper limits $x_{u,1}, x_{u,2}, \ldots, x_{u,n}$ and lower limits $x_{l,1}, x_{l,2}, \ldots, x_{l,n}$, these upper limits and lower limits are not intended for limiting the scope of the present invention. In other words, the present invention may also be applied to an example without upper limit or lower limit. The example without upper limit or lower limit is only a special case of foregoing embodiment with the upper limits $x_{u,1}, x_{u,2}, \ldots, x_{u,n}$ as infinite and the lower limits $x_{l,1}, x_{l,2}, \ldots, x_{l,n}$ as 0.

Next, in step S41, a distributed computing method is adopted to allow each of the leaf nodes to perform local computation and upload the computation result to the internal node connected to the leaf node (i.e. the parent node of the leaf node). The parent node then sends the computation results of its child nodes to its parent node until all the computation results are sent to the root node $S_0$. As to the leaf nodes, foregoing computation results are the energy tables described above, and as to nodes other than the leaf nodes, these computation results include aforementioned energy tables and decision tables.

Finally, in step S42, the root node $S_0$ allocates the sampling rates of the child nodes of the root node and the numbers of samples to be uploaded to the root node $S_0$ from its child nodes according to the total number of samples and the computation result thereof so that the optimal sampling rates can be allocated to its child nodes. These child nodes further allocate the sampling rates of their child nodes and numbers of samples to be provided by their child nodes according to the computation results thereof and the numbers of samples to be uploaded to their parent nodes. As described above, the sampling rates are allocated to each level of nodes, and the process is completed when each of the leaf nodes are allocated with a sampling rate.

[Algorithm of Leaf Nodes]

Figure 5:
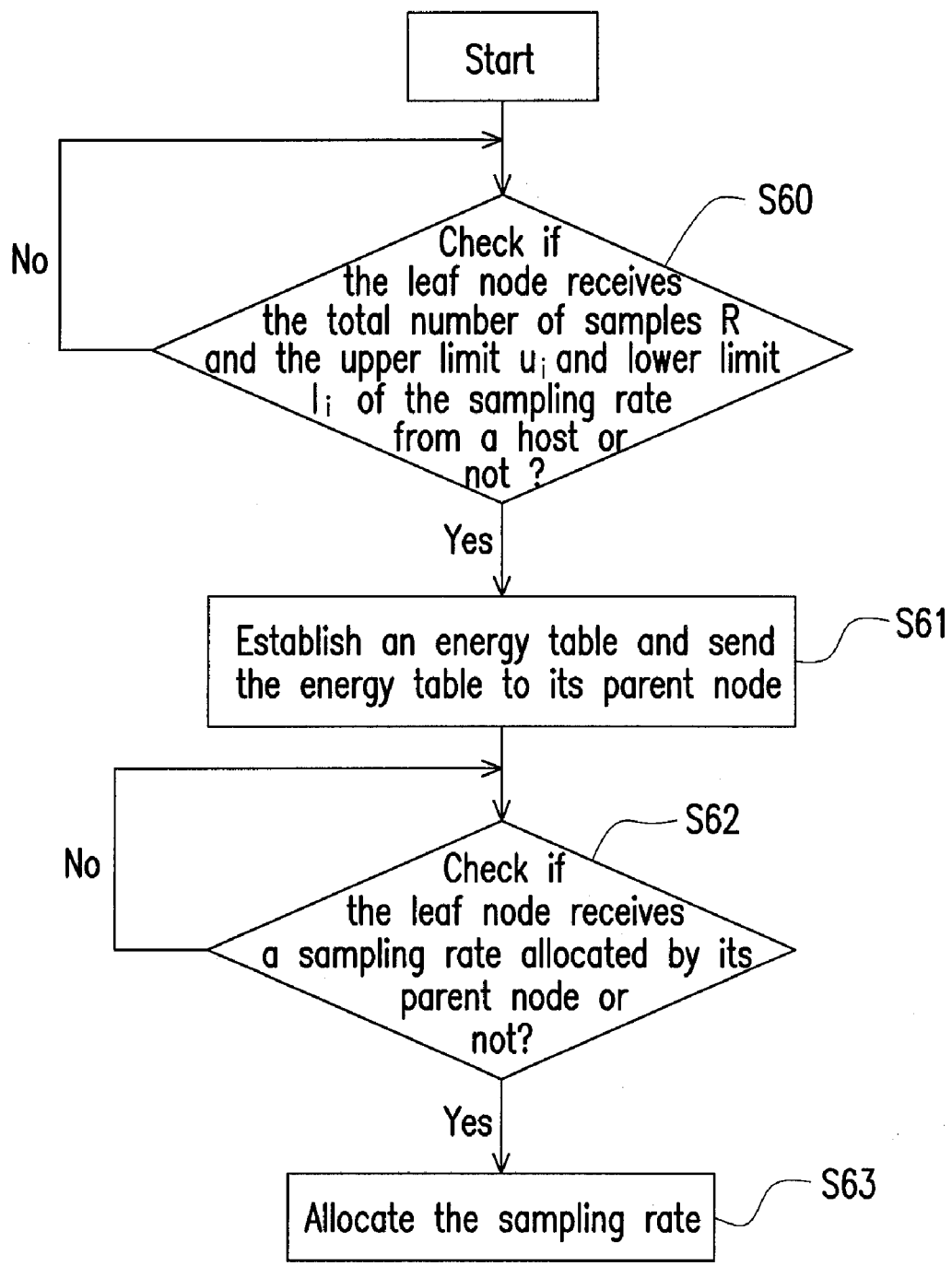
FIG. 5 is a flowchart of a leaf node algorithm in a sampling rate allocation method for a wireless sensor network according to an embodiment of the present invention.

FIG. 5 is a flowchart of a leaf node algorithm in a sampling rate allocation method for a wireless sensor network according to an embodiment of the present invention. Referring to FIG. 5, in step S60, the leaf node $S_i$ determines whether a total sample number R and the upper limit $u_{,i}$ and lower limit $l_{,i}$ of the sampling rate $x_i$ are received from the root node $S_0$, wherein if the leaf node $S_i$ does not receive the total number of samples R and the upper limit $u_{,i}$ and lower limit $l_{,i}$ of the sampling rate $x_i$, the leaf node waits until it receives the total number of samples R and the upper limit $u_{,i}$ and lower limit $l_{,i}$ of the sampling rate $x_i$ from the root node $S_0$; otherwise, step S61 is executed. In step S61, the leaf node $S_i$ calculates and establishes its own energy table $E_i$, wherein the energy table $E_i$ has R+1 rows, each row has a field, the field of the $0^{th}$ row represents the original energy $e_i$ of the leaf node $S_i$, and the field $E_i[j]$ of the $j^{th}$ row (j>0) represents the remaining energy thereof after the leaf node $S_i$ provides j samples, the computation thereof can be expressed as:

$$E_i[j] = \begin{cases} e_i - (\gamma_i + \alpha_{i,p})j, & \text{if } j \leq x_{u,i} \\ 0, & \text{others} \end{cases}$$

wherein the node $S_p$ represents the parent node of the leaf node $S_i$. After the field of each row in the energy table $E_i$ is calculated, the leaf node $S_i$ sends the energy table $E_i$ to its parent node $S_p$. After that, in step S62, the leaf node $S_i$ determines whether its parent node $S_p$ allocates a sampling rate $x_i$ for the leaf node $S_i$, wherein if the parent node $S_p$ allocates the sampling rate $x_i$ for the leaf node $S_i$, step S63 is then executed; otherwise, the leaf node $S_i$ waits until its parent node $S_p$ allocates the sampling rate $x_i$ for it. In step S63, the parent node $S_p$ allocates the sampling rate $x_i$ for the leaf node $S_i$, and the leaf node $S_i$ senses samples according to the sampling rate allocated by its parent node $S_p$.

It should be noted herein that even though in the present embodiment, the sampling rates $x_1, x_2, \ldots, x_n$ have their upper limits $x_{u,1}, x_{u,2}, \ldots, x_{u,n}$ and lower limits $x_{l,1}, x_{l,2}, \ldots, x_{l,n}$, these upper and lower limits are not intended for limiting the scope of the present invention. In other words, the present invention may also be applied in an example without upper or lower limit. The example without upper or lower limit is only a special case of foregoing embodiment with the upper limits $x_{u,1}, x_{u,2}, \ldots, x_{u,n}$ as infinite and the lower limits $x_{l,1}, x_{l,2}, \ldots, x_{l,n}$ as 0. Setting the upper limits $x_{u,1}, x_{u,2}, \ldots, x_{u,n}$ and the lower limits $x_{l,1}, x_{l,2}, \ldots, x_{l,n}$ of the sampling rates $x_1, x_2, \ldots, x_n$ is only to restrict the sampling rate of each node to be between its upper limit and lower limit, and by fairly setting the upper and lower limit of the sampling rate of each node, an good fairness can be achieved in the sampling rate allocation method and the wireless sensor network provided by the present invention. However, the sampling rate of each node may also have no upper or lower limit in the sampling rate allocation method and the wireless sensor network provided by the present invention.

[Algorithms of Internal Node and Root Node]

Figure 6:
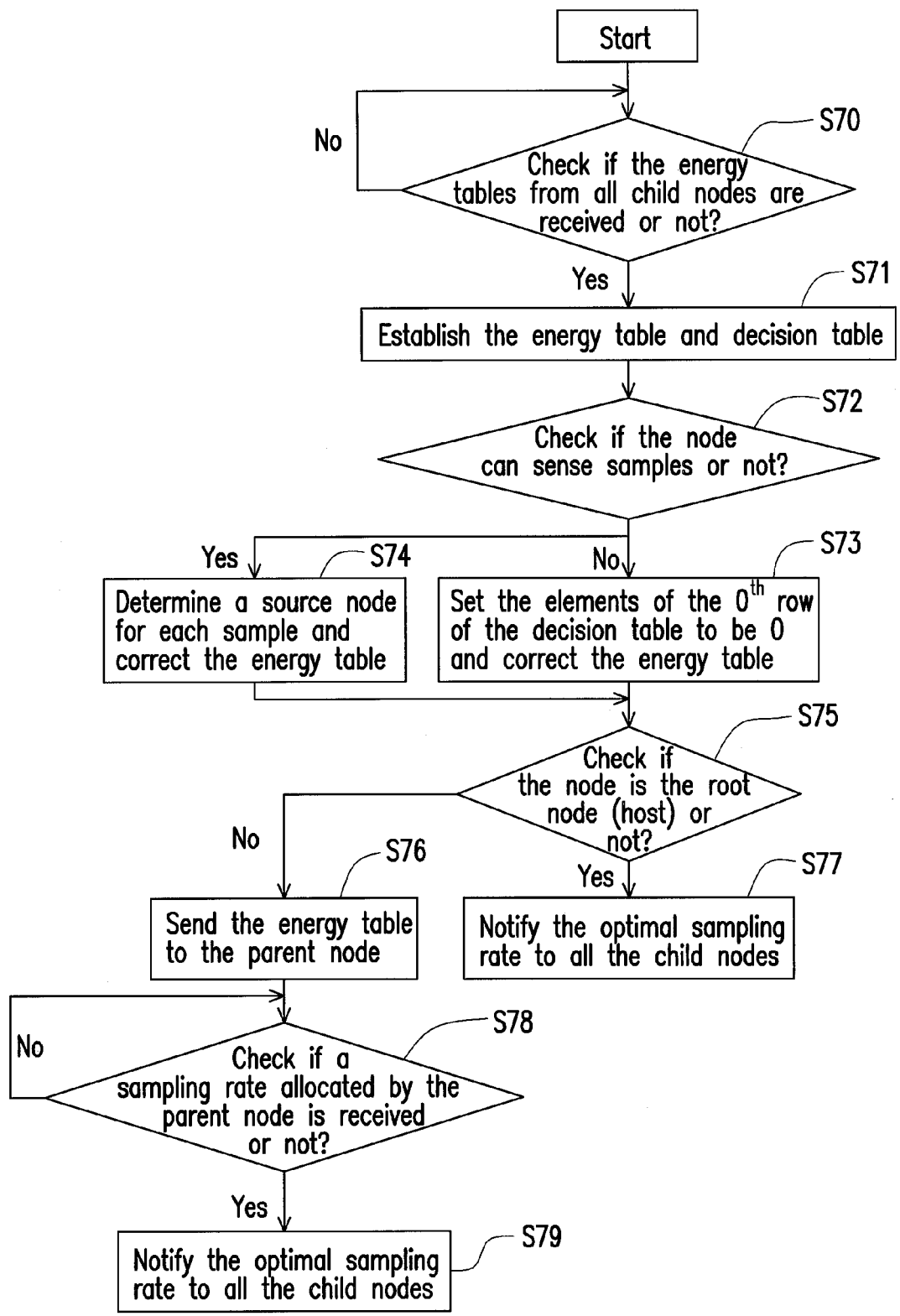
FIG. 6 is a flowchart of a root node algorithm or an internal node algorithm in a sampling rate allocation method for a wireless sensor network according to an embodiment of the present invention.

FIG. 6 is a flowchart of a root node algorithm or an internal node algorithm in a sampling rate allocation method for a wireless sensor network according to an embodiment of the present invention. Referring to FIG. 6, first, in step S70, the node $S_k$ determines whether the energy tables of all its child nodes are received, wherein if the node $S_k$ has received the energy tables of all its child nodes, step S71 is executed; otherwise, the node $S_k$ waits until the energy tables of all its child nodes are received.

In step S71, the node $S_k$ determines a source node for each sample starting from the $1^{st}$ sample to the $R^{th}$ sample. The node $S_k$ selects the node having the most remaining energy after the sample is provided as the source node of the sample. Taking the $1^{st}$ sample as an example, assuming that the node $S_k$ has y child nodes, and $E_1[1], E_2[1], E_3[1], \ldots, E_y[1]$ are used for respectively denoting the remaining energy of the child nodes of the node $S_k$ after a sample is provided. The node $S_k$ selects the child node having the most remaining energy as the source node of the sample, namely, the source node is selected based on $\max\{E_1[1], E_2[1], E_3[1], \ldots, E_y[1]\}$. For the convenience of description, the parameter $\delta_i$ is defined as the number of samples already provided by the child node $S_i$ of the node $S_k$, and $\delta_i$ is increased by 1 whenever the node $S_i$ provides a sample.

When the child nodes of the internal node $S_k$ have not provided any sample, $\delta_i=0$, wherein i=1~y. Then the values in the $0^{th}$ row of the decision table $D_k$ are all 0, and if the $j^{th}$ child node is selected as the source node of the $1^{st}$ sample, $\delta_j$ is increased by 1. Next, $\delta_1 \sim \delta_y$ are sequentially filled into the $1^{st}$ row of the decision table $D_k$, and accordingly $D_k[1,j]=1$ and $D_k[1,i]=0$, i≠j. Here the remaining energy of the $j^{th}$ child node is $E_j[1]$, and the remaining energies of the other child nodes $S_i$ are still $E_i[0]$ since they do not provide any sample. Thus, after the child nodes of the node $S_k$ obtain a sample, the critical energy is $E_k[1]$, $E_k[1]=\min\{E_1[0],E_2[0],E_3[0],\ldots,E_j[1],\ldots,E_y[0]\}$. As described above, the source node of the $m^{th}$ sample is selected based on $\max\{E_1[\delta_1+1],E_2[\delta_2+1],E_3[\delta_3+1],\ldots,E_y[\delta_y+1]\}$. If the $j^{th}$ child node is selected again, then $\delta_j=\delta_j+1$, and the other $\delta_i$ having i≠j are not changed. The $m^{th}$ row of the decision table $D_k$ is respectively filled with each $\delta_i$, wherein i=1,2,…,y, and thus each element of the $m^{th}$ row is updated. Namely, $D_k[m,i]=\delta_i$. The critical energy herein is $E_k[m]=\min\{E_1[\delta_1],E_2[\delta_2],E_3[\delta_3],\ldots,E_y[\delta_y]\}$.

Since the sampling rate $x_i$ of each child node $S_i$ is allocated with a lower limit $l_{,i}$, the lower limit $l_{,i}$ of the sampling rate $x_i$ should be sent to each child node $S_i$ first, and then the samples are sequentially calculated starting from the $$\left(\sum_{i=1}^{y} x_{l,i}\right)^{th}$$

sample to the last sample (i=R) through the method described above. By now, the decision table $D_k$ and the energy table $E_k$ are completed. After that, in step S72, determine whether the internal node $S_k$ itself can sense to obtain samples. If the internal node $S_k$ itself cannot sense any object, step S73 is then executed; otherwise, step S74 is executed. However, if the sampling rate has no upper or lower limit, then foregoing step of sequentially calculating the samples from the $$\left(\sum_{i=1}^{y} x_{l,i}\right)^{th}$$

sample to the last sample (i=R) is changed to calculating from the $1^{st}$ sample to the last sample (i=R).

In the steps S73 and S74, the node $S_k$ corrects the energy table $E_k$ and the decision table $D_k$ based on the affection of the energy thereof to the energy table $E_k$ and the decision table $D_k$. In step S74, the node $S_k$ itself can take samples. Thus, the samples may come from the child nodes of the node $S_k$ or from the node $S_k$ itself. Here a virtual node $S_c$ is used for representing all the child nodes of the node $S_k$, and the energy table $E_c$ and the decision table $D_c$ of the virtual node $S_c$ are respectively the energy table $E_k$ and the decision table $D_k$ obtained in step S71, namely, $E_c=E_k$ and $D_c=D_k$.

The node $S_k$ determines whether each sample should be sensed by the node $S_k$ itself or should be provided by the virtual node $S_c$. Taking the $1^{st}$ sample as an example, the energy for sensing a sample and for sending a sample will be consumed if the node $S_k$ senses the sample itself, namely, the remaining energy of the node $S_k$ is $e'_k=e_k-\gamma_k\times1-\alpha_{k,p}\times1$, wherein $S_p$ represents the parent node of the node $S_k$. Then the energy of the virtual node $S_c$ will remain at $E_c[0]$. If the node $S_k$ does not sense the sample itself but the sample is provided by the virtual node $S_c$, the energy for receiving a sample and for sending a sample will be consumed, namely, the remaining energy of the node $S_k$ is $e'_k=e_k-\beta_k\times1-\alpha_{k,p}\times1$, and the energy of the virtual node $S_c$ is reduced to $E_c[1]$. Next, foregoing two situations will be compared and the combination which allows the node $S_k$ and the virtual node $S_c$ to have the most remaining energy after a sample is provided is selected. If the node $S_k$ is selected to provide the sample, then $D_k[1,0]=1$, $D_k[1,1]=D_k[1,2]=$ . . . $=D_k[1,y]=0$, and $E_k[1]=\min\{e_k-\gamma_k\times1-\alpha_{k,p}\times1, E_c[0]\}$. Contrarily, if the virtual node $S_c$ is selected to provide the sample, then $D_k[1,0]=0$, $D_k[1,1]=D_c[1,1]$, $D_k[1,2]=D_c[1,2]$, . . . , $D_k[1,y]=D_c[1,y]$, and $E_k[1]=\min\{e_k-\beta_k\times1-\alpha_{k,p}\times1, E_c[1]\}$. As described above, every combination has to be checked when m samples are provided. In other words, all the situations from the node $S_k$ providing 0 sample and the virtual node $S_c$ providing m samples to the internal node $S_k$ providing m samples and the virtual node $S_c$ providing 0 samples should be checked. Thus, there are totally m+1 combinations to be checked. For example, if the node $S_k$ provides w samples and the virtual node $S_c$ provides (i-w) samples, the remaining energy of the node $S_k$ is $e'_k=e_k-\gamma_k\times w-\beta_k\times(m-w)-\alpha_{k,p}\times m$, and the remaining energy of the virtual node $S_c$ is $E_c[m-w]$. The combination among all of foregoing combinations which allows the critical energy to have the maximum value is selected, so as to complete step S74. Taking providing m samples as example, assuming the optimal combination is that the internal node $S_k$ senses q samples and the virtual node $S_c$ provides m-q samples, then there are $D_k[m,0]=q$ in the $0^{th}$ field of the $m^{th}$ row of the decision table $D_k$ and $D_k[m,1]=D_k[m-q,1]$, $D_k[m,2]=D_k[m-q,2]$, . . . , $D_k[m,y]=D_k[m-q,y]$ in the other fields of the $m^{th}$ row, and the critical energy is $E_k[m]=\min\{e_k-\gamma_k\times a-\beta_k\times(m-q)-\alpha_{k,p}\times m, E_c[m-q]\}$.

As described above, if it is determined in step S72 that the node $S_k$ cannot sense samples itself, step S73 is then executed. In step S73, since the node $S_k$ cannot sense samples, the $0^{th}$ field of every row of the decision table $D_k$ is always 0, and accordingly, all the samples come from the child nodes of the node $S_k$. The virtual node $S_c$ is also used herein for representing all the child nodes of the node $S_k$, and the energy table $E_k$ and the decision table $D_k$ obtained in step S72 are copied. Next, the energy table $E_k$ is corrected as $E_k=\min\{e_k-\beta_k\times m-\alpha_{k,p}\times m, E_c[m]\}$ (expression 1).

Step S75 is executed after step S74 or S73. In step S75, determine whether the node $S_k$ is the root node. If the node $S_k$ is the root node, then step S77 is executed; otherwise, the step S76 is executed.

If the internal node $S_k$ is the root node $S_0$, in step S77, the root node $S_0$ allocates the number of samples to be provided by the child nodes of the root node $S_0$ according to the $R^{th}$ row of the decision table $D_0$. In other words, assuming that the root node $S_0$ has y child nodes, then the root node $S_0$ notifies the values of $D_0[R,1], D_0[R,2], \ldots, D_0[R,y]$ respectively to its child nodes, and by now all the computations of the root node $S_0$ are completed.

If the node $S_k$ is not the root node $S_0$, then in step S76, the node $S_k$ send the energy table to its parent node $S_p$. In step S78, the node $S_k$ determines whether the number of samples to be provided by the node $S_k$ is received from its parent node $S_p$. If the node $S_k$ has received the number of samples it should provide, then step S79 is executed; otherwise, the node $S_k$ waits until it receives the number of samples to be provided by the node $S_k$ from its parent node $S_p$. In step S79, the node $S_k$ looks up its decision table according to the number of samples allocated by its parent node $S_p$, allocates its own sampling rate, and notifies its child nodes about the number of samples to be provided by these child nodes. This process goes on level by level so that the sampling rate of the node $S_k$ in every level is allocated, and the nodes at the upper level of the leaf nodes determine the sampling rates of their leaf nodes and the sampling rates of themselves. Taking the node $S_k$ as an example, assuming that the node $S_k$ has y child nodes, if the parent node $S_p$ notifies the node $S_k$ that it should provide L samples. The node $S_k$ then looks up its own decision table $D_k$ according to the number L, the sampling rate thereof is $D_k[L,0]$, and the numbers of samples to be provided by its child nodes are respectively $D_k[L,1], D_k[L,2], \ldots, D_k[L,y]$.

EXAMPLE 2

An example showing how to calculate and establish an energy table and a decision table and how to allocate a sampling rate by using the energy table and the decision table through the method described in foregoing embodiment will be described below. However, this example is not intended for limiting the scope of the present invention.

Figures 7, 8:
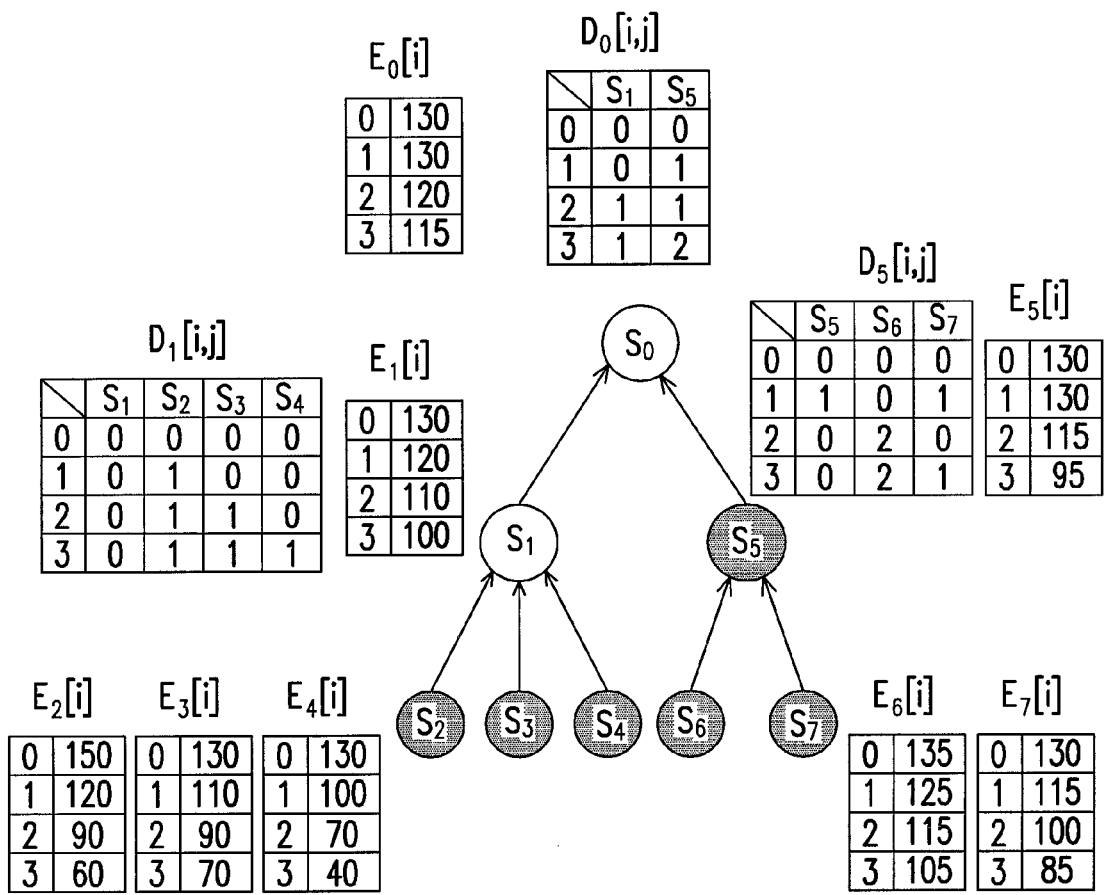
FIG. 7 is a schematic diagram of a wireless sensor network 80 in tree topology.
FIG. 8 is a parameter table of nodes $S_0$~$S_7$ in FIG. 7.

FIG. 7 is a schematic diagram of a wireless sensor network 80 in tree topology. The nodes $S_2$, $S_3$, $S_4$, $S_5$, $S_6$, and $S_7$ can sense samples automatically, while the nodes $S_0$ and $S_1$ cannot sense samples. The nodes $S_2$, $S_3$, $S_4$, $S_6$, and $S_7$ are leaf nodes, the nodes $S_1$ and $S_5$ are internal nodes, and the node $S_0$ is the root node.

FIG. 8 is a parameter table of the nodes $S_0$~$S_7$ in FIG. 7. Referring to both FIG. 7 and FIG. 8, if it is assumed herein that the total number of samples has value R=3 and $\rho=\infty$ (i.e. the lower limit of the sampling rate is 0 and the upper limit thereof is R), according to the method described in foregoing embodiment, the node $S_0$ broadcasts the total number of samples R required with a specific interval T and the upper limits $x_{u,1}, \ldots, x_{u,7}$ and the lower limits $x_{l,1}, \ldots, x_{l,7}$ of the sampling rates $x_1, \ldots, x_7$ of the nodes $S_1, \ldots, S_7$ to the entire network. Next, the leaf nodes $S_2$, $S_3$, $S_4$, $S_6$, and $S_7$ calculates their energy tables $E_2$, $E_3$, $E_4$, $E_6$, and $E_7$ after they receive the total number of samples R and the upper limits $x_{u,1}, \ldots, x_{u,7}$ and the lower limits $x_{l,1}, \ldots, x_{l,7}$ of the sampling rates $x_1, \ldots, x_7$ from the node $S_0$. For example, $E_2[1]=e_2-\gamma_2-\alpha_{2,1}=150-10-20=120$. After the leaf nodes $S_2$, $S_3$, $S_4$, $S_6$, and $S_7$ establish their energy tables $E_2$, $E_3$, $E_4$, $E_6$, and $E_7$, the leaf nodes $S_2$, $S_3$, and $S_4$ send the energy tables $E_2$, $E_3$, and $E_4$ to their parent node $S_1$, and the leaf nodes $S_6$ and $S_7$ sends the energy tables $E_6$ and $E_7$ to their parent node $S_5$. The nodes $S_1$ and $S_5$ calculate their energy tables $E_1$ and $E_5$ and decision tables $D_1$ and $D_5$ after they receive the energy tables from all of their child nodes. Taking the internal node $S_1$ as an example, the one having the maximum value among $E_2[1]$, $E_3[1]$, and $E_4[1]$ is selected as the source node of the 1$^{st}$ sample. Thus, the node $S_2$ is selected, and accordingly $D_1[1, 2]=1$. The critical energy of the child nodes of the node $S_1$ after the 1$^{st}$ sample is provided is $E_1[1]=\min\{E_2[1],E_3[0],E_4[0]\}=120$. Taking the 2$^{nd}$ sample as an example, the node $S_1$ selects the one having the maximum value among $E_2[2]$, $E_3[1]$, and $E_4[1]$ as its source node. Thus, the node $S_3$ is selected and accordingly $D_1[2,3]=1$, and the numbers of samples to be provided by the leaf nodes $S_2$ and $S_4$ are not changed. Herein, the critical energy of the child nodes of the internal node $S_1$ after the 2$^{nd}$ sample is provided is $E_1[2]=\min\{E_2[1], E_3[1], E_4[0]\}=120$. Repeating the calculation as the described above, the energy table $E_1$ and the decision table $D_1$ of the node $S_1$ can be completed.

Thereafter, the energy table $E_1$ and the decision table $D_1$ are corrected according to whether the non-leaf node $S_1$ can automatically sense samples. In the present example, the virtual node $S_c$ represents the child nodes $S_2$~$S_4$ of the node $S_1$, wherein $E_c=E_1$ and $D_c=D_1$. Because the internal node $S_1$ cannot sense any sample, the values in the 0$^{th}$ row of the decision table $D_1$ are all 0. Then, $E_1[m]=\min\{e_1-\beta_1 \times m-\alpha_{1,0} \times m, E_c[m]\}$ can be calculated as expression 1. After that, the energy table $E_1$ can be corrected. For example, $E_1[1]=\min\{e_1-\beta_1 \times 1-\alpha_{1,0} \times 1, E_c[1]\}=120$, and the other $E_1[m]$ can be calculated similarly. After the energy table $E_1$ is corrected, the node $S_1$ sends the energy table $E_1$ to the root node $S_0$.

Figure 9:
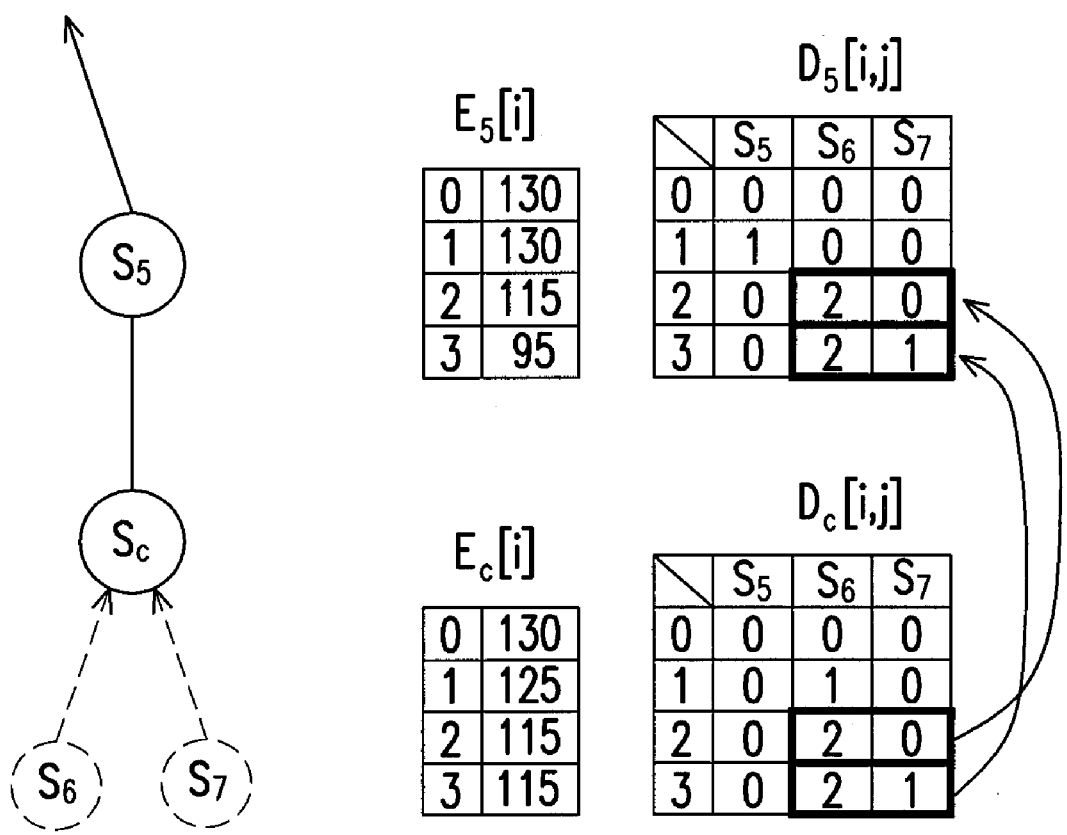
FIG. 9 is a conceptual diagram illustrating the correction of an energy table $E_5$ and a decision table $D_5$.

Next, the energy table $E_5$ and the decision table $D_5$ are corrected according to whether the internal node $S_5$ can automatically sense samples. In the present example, the virtual node $S_c$ represents all the child nodes $S_6$ and $S_7$ of the internal node $S_5$, wherein $E_c=E_5$ and $D_c=D_5$. Because the internal node $S_5$ can automatically sense samples, the internal node $S_5$ or the leaf node $S_6$ or $S_7$ may be the source node of each sample. FIG. 9 is a conceptual diagram illustrating the correction of the energy table $E_5$ and the decision table $D_5$. Referring to FIG. 9, taking providing 1 sample as an example, if the sample is provided by the internal node $S_5$, then the critical energy of the internal node $S_5$ and the virtual node $S_c$ after providing the 1$^{st}$ sample is $\min\{e_5-\gamma_5 \times 1-\alpha_{5,0} \times 1, E_c[0]\}=130$; if the sample is provided by the virtual node $S_c$, then the critical energy of the internal node $S_5$ and the virtual node $S_c$ after providing the 1$^{st}$ sample is $\min\{e_5-\beta_5 \times 1-\alpha_{5,0} \times 1, E_c[1]\}=125$. Thereby, it can be understood from foregoing examples that the critical energy has a larger value when the node $S_5$ is selected to provide the sample, namely, $D_5[1,0]=1$, $D_5[1,1]=0$, $D_5[1,2]=0$.

Similarly, the internal node $S_5$ calculates through the same method when 2 samples are to be provided. In this case, there are three combinations. The first combination is that the node $S_5$ provides 0 sample, and the virtual node $S_c$ provides 2 samples, wherein the critical energy is $\min\{e_5-\beta_5 \times 2-\alpha_{5,0} \times 2, E_c[2]\}=115$. The second combination is that the node $S_5$ provides 1 sample, and the virtual node $S_c$ provides 1 sample, wherein the critical energy is $\min\{e_5-\beta_5 \times 1-\gamma_5 \times 1-\alpha_{5,0} \times 2, E_c[1]\}=110$. The third combination is that the node $S_5$ provides 2 samples, and the virtual node $S_c$ provides 0 sample, wherein the critical energy is $\min\{e_5-\gamma_5 \times 2-\alpha_{5,0} \times 2, E_c[0]\}=105$. It can be understood from foregoing calculations that when 2 samples are to be provided, preferably the virtual node $S_c$ is selected to provide the 2 samples. Herein, $D_5[2,0]=0$, $D_5[2,1]=D_c[2,1]$, $D_5[2,2]=D_c[2,2]$, and the critical energy is $\min\{e_5-\beta_5 \times 2-\alpha_{5,0} \times 2, E_c[2]\}=115$. Foregoing method may also be applied when 3 samples are to be provided. After the energy table $E_5$ and the decision table $D_5$ are corrected, the node $S_5$ sends the energy table $E_5$ to the root node $S_0$.

The root node $S_0$ establishes the energy table $E_0$ and the decision table $D_0$ through the same method after it receives the energy tables $E_1$ and $E_5$. It can be understood based on the energy table $E_0$ and the decision table $D_0$ that when 3 samples are to be sensed within the specific interval T, preferably, the node $S_1$ is selected to provide 1 sample and the $S_5$ is selected to provide 2 samples. The root node $S_0$ notifies the result to the internal nodes $S_1$ and $S_5$. The internal node $S_1$ looks up the 1$^{st}$ row in the decision table $D_1$ and understands that when 1 sample is to be provided, the leaf node $S_2$ should be selected to provide the sample. Similarly, the node $S_5$ looks up the 2$^{nd}$ row in the decision table $D_5$ and understands that when 2 samples are to be provided, the leaf nodes $S_6$ should be selected to provide the 2 samples. Next, the internal nodes $S_1$ and $S_5$ respectively notify the optimal sampling rates to their child nodes $S_2$, $S_3$, $S_4$, $S_6$, and $S_7$, so as to complete the allocation of the sampling rates $x_1, \ldots, x_7$ to the nodes $S_1, S_2, \ldots, S_7$. In this example, the total number of samples R=3, the sampling rates of the nodes $S_1$~$S_7$ are $(x_1,x_2,x_3,x_4,x_5,x_6,x_7)=(0,1,0,0,0,2,0)$, and the critical energy is $E_0[3]=115$.

[Method for Implementing Upper Limits and Lower Limits of Sampling Rates]

As described above, the requirement of fairness is met. Generally speaking, a user can allocate the upper limits and the lower limits of the sampling rates by using an application program. Herein, two methods for allocating the upper limits and the lower limits of the sampling rates will be described. However, these two methods are only embodiments of the present invention but not intended for limiting the scope of the present invention.

The first method is a minimum mean deviation method. According to the minimum mean deviation method, the sampling rate of each node and the average sampling rate are restricted within a specific range $\rho$, wherein $\rho$ can be set by the user. If the total number of samples is R and there are n nodes which can sense to obtain samples, then the average sampling rate is A=R/n, and accordingly the upper and lower limit of the sampling rate of each node which can sense are $[A(1-\rho), A(1+\rho)]$. For example, if $\rho=10\%$, then the upper limit of the sampling rate of each node which can sense an object is $A(1+10\%)$, and the lower limit thereof is $A(1-10\%)$.

The second method is a weighting method. According to the weighting method, different weight is allocated to each node which can sense according to the physical position, the network position, or the sensing distance between the sensed object and the node. Assuming that $W_1, W_2, \ldots, W_n$ are the weights of the nodes $S_1 \sim S_n$ which can sense object, wherein $0 < W_i < 1$, $W_1 + W_2 + \ldots + W_n = 1$, the upper limit and the lower limit of the sampling rate of the node $S_i$ are $[W_i*R(1-\rho), W_i*R(1+\rho)]$. For example, R=100, $\rho$=10%, and $W_1, W_2, W_3, W_4$ are respectively 0.25, 0.25, 0.1, and 0.4, then the upper limits and the lower limits of the sampling rates of the nodes $S_1 \sim S_4$ are respectively $[25(1-10\%), 25(1+10\%)]$, $[25(1-10\%), 25(1+10\%)]$, $[10(1-10\%), 10(1+10\%)]$, and $[40(1-10\%), 40(1+10\%)]$.

EXAMPLE 3

The method for allocating sampling rates by using energy tables and decision tables in a wireless sensor network as described in foregoing embodiment will be described with reference to an example, wherein the sampling rates are allocated with upper limits and lower limits. However, this example is not intended for limiting the present invention.

Figure 10:
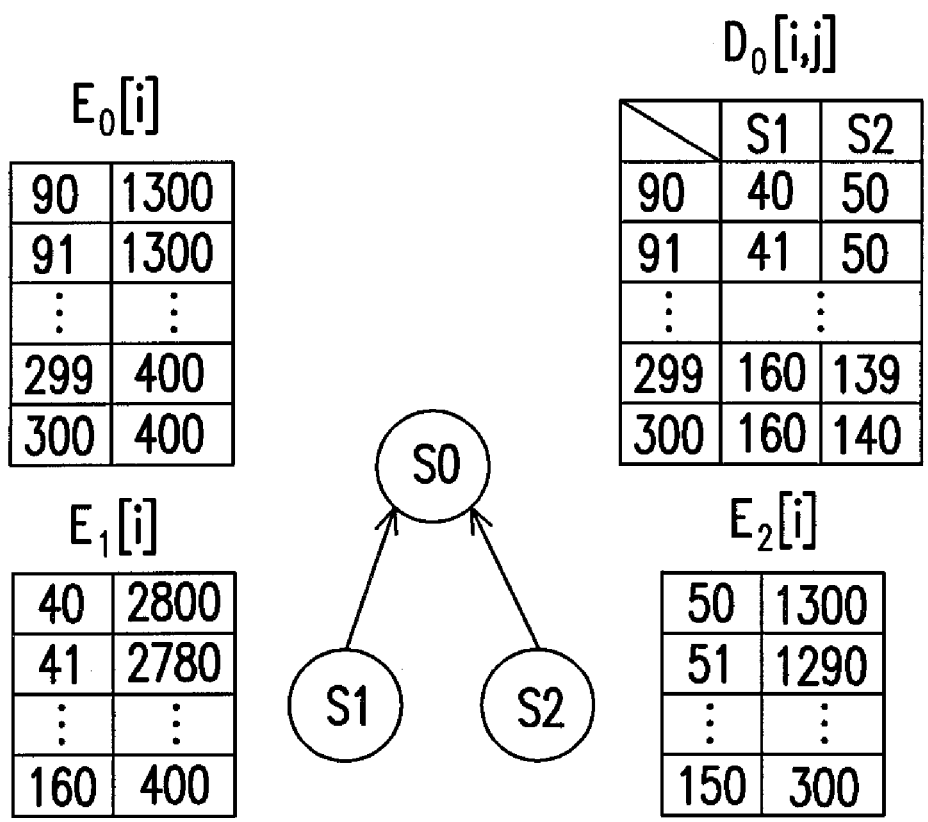
FIG. 10 is a schematic diagram of a wireless sensor network 60 in tree topology.

FIG. 10 is a schematic diagram of a wireless sensor network 60 in tree topology. The nodes $S_0$, $S_1$, and $S_2$ have already establish their energy tables or decision tables through the method described above, and the sampling rates of the leaf nodes $S_1$ and $S_2$ are allocated with upper limits and lower limits. As shown in FIG. 10, assuming the total number of samples R=300 and the upper and lower limits of the sampling rates of the nodes $S_1$ and $S_2$ are respectively [40, 160] and [50, 150]. As described above, the energy table of the node $S_0$ records the remaining energy after the node $S_0$ receives (50+40)=90 samples to 300 samples.

In overview, the present invention provides a wireless sensor network and a sampling rate allocation method thereof. In the sampling rate allocation method, a distributed computing method is adopted so as to allow the wireless sensor network in tree topology to have a longer life time and meet the requirements to both total sample number and fairness. Moreover, since the wireless sensor network has a longer life time, the cost for replacing the batteries (for example, solar cells) of nodes and the volume of the batteries can be both reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wireless sensor network, comprising:
a root node, for sending a total sample number to at least one internal node and a plurality of leaf nodes, wherein the total number of samples is the number of samples to be sensed by the wireless sensor network within a specific time;
the leaf nodes, wherein each of the leaf nodes calculates the remaining energy after providing a sample and generates a first calculation result, and the leaf node uploads the first calculation result to the internal node; and
the internal node, wherein the internal node generates a second calculation result and a third calculation result based on the first calculation results and uploads the second calculation result to the root node;
wherein the root node generates a fourth calculation result and a fifth calculation result based on the second calculation result, then the root node determines the number of samples to be sent by the internal node to the root node within the specific time according to the fifth calculation result and the total number of samples, and finally, the internal node determines the number of samples to be sensed by the internal node and the leaf nodes within the specific time according to the number of samples to be sent by the internal node to the root node and the third calculation result.

2. The wireless sensor network according to claim 1, wherein the first calculation results are energy tables of the leaf nodes, the second calculation result and the third calculation result are respectively an energy table and a decision table of the internal node, and the fourth calculation result and the fifth calculation result are respectively an energy table and a decision table of the root node.

3. The wireless sensor network according to claim 2, wherein the internal node calculates a temporary decision table and a temporary energy table according to the energy tables of the leaf nodes and then corrects the temporary decision table and the temporary energy table according to whether the internal node can automatically sense samples so as to generate the decision table and the energy table of the internal node, the decision table of the internal node records the mapping between the number of samples to be uploaded by the internal node to the root node within the specific time and the number of samples to be sensed by the internal node and the leaf nodes, and the decision table of the root node records the mapping between the total number of samples and the number of samples to be provided by the internal node to the root node.

4. The wireless sensor network according to claim 2, wherein the root node further sends a maximum sampling rate and a minimum sampling rate of the internal node and a maximum sampling rate and a minimum sampling rate of each of the leaf nodes, the number of samples to be sensed by the internal node within the specific time has to be between the maximum sampling rate and the minimum sampling rate of the internal node, and the number of samples to be sensed by each of the leaf nodes within the specific time has to be between the maximum sampling rate and the minimum sampling rate of the leaf node.

5. The wireless sensor network according to claim 4, wherein the maximum sampling rate and the minimum sampling rate of the internal node and the maximum sampling rate and the minimum sampling rate of each of the leaf nodes are determined through a minimum mean deviation method or a weighting method.

6. A wireless sensor network, comprising:
a root node, for sending a total sample number to a plurality of leaf nodes, wherein the total number of samples is the number of samples to be sensed by the wireless sensor network within a specific time; and
the leaf nodes, wherein each of the leaf nodes calculates the remaining energy after providing a sample and generates a first calculation result, and the leaf node uploads the first calculation result to the root node;
wherein the root node generates a second calculation result and a third calculation result based on the first calculation results, and then the root node determines the number of samples to be sensed by the leaf nodes within the specific time according to the third calculation result and the total number of samples.

7. The wireless sensor network according to claim 6, wherein the first calculation results are energy tables of the leaf nodes, and the second calculation result and the third calculation result are respectively an energy table and a decision table of the root node.

8. The wireless sensor network according to claim 7, wherein the decision table of the root node records the mapping between the total number of samples and the number of samples to be sensed by the leaf nodes.

9. The wireless sensor network according to claim 7, wherein the root node further sends a maximum sampling rate and a minimum sampling rate of each of the leaf nodes, and the number of samples to be sensed by each of the leaf nodes within the specific time has to be between the maximum sampling rate and the minimum sampling rate of the leaf node.

10. The wireless sensor network according to claim 9, wherein the maximum sampling rate and the minimum sampling rate of each of the leaf nodes are determined through a minimum mean deviation method or a weighting method.

11. A sampling rate allocation method, suitable for a wireless sensor network in tree topology, wherein the wireless sensor network comprises a root node and a plurality of leaf nodes, the sampling rate allocation method comprising:
sending a total sample number to each of the leaf nodes by using the root node, wherein the total number of samples is the number of samples to be sensed by the wireless sensor network within a specific time;
calculating the remaining energy of each of the leaf nodes after the leaf node provides a sample, generating a first calculation result, and uploading the first calculation result to the root node by using the leaf node;
generating a second calculation result and a third calculation result based on the first calculation results by using the root node; and
determining the number of samples to be sensed by the leaf nodes within the specific time according to the third calculation result and the total number of samples by using the root node.

12. The sampling rate allocation method according to claim 11, wherein the first calculation results are energy tables of the leaf nodes, the second calculation result and the third calculation result are respectively an energy table and a decision table of the root node, and the decision table of the root node records the mapping between the total number of samples and the number of samples to be sensed by the leaf nodes.

13. The sampling rate allocation method according to claim 12, wherein the process executed by each of the leaf nodes comprises:
determining whether a total sample number R is received from the root node $S_0$ by using the leaf node $S_i$, wherein if the total number of samples R is not received, the leaf node $S_i$ waits until the total number of samples R is received from the root node $S_0$;
beginning to calculate and establish an energy table $E_i$ of the leaf node $S_i$ by using the leaf node $S_i$, wherein the energy table $E_i$ has R+1 rows, each of the rows has a field, the field of the $0^{th}$ row represents the original energy of the leaf node $S_i$, and the field $E_i[j]$ of the $j^{th}$ row (j>0) represents the remaining energy after the leaf node $S_i$ provides a $j^{th}$ sample;
sending the energy table $E_i$ to the root node $S_0$ by using the leaf node $S_i$ after the fields of all the rows in the energy table $E_i$ are calculated; and
determining whether the root node $S_0$ designates a number $x_i$ of samples to be sensed by the leaf nodes within the specific time by using the leaf node $S_i$, wherein if the root node $S_0$ designates the number $x_i$, the leaf node $S_i$ senses and captures samples according to the number $x_i$ designated by the root node $S_0$; otherwise, the leaf node $S_i$ waits until the root node $S_0$ designates the number $x_i$.

14. The sampling rate allocation method according to claim 12, wherein the process executed by the root node comprises:
determining whether the energy tables sent by the leaf nodes are received by using the root node $S_0$, wherein if the root node $S_0$ does not receive the energy tables, the root node $S_0$ waits until the energy tables sent by the leaf nodes are received;
determining a source node of each sample until the $R^{th}$ sample by using the root node $S_0$, wherein the root node $S_0$ selects the leaf node $S_i$ having the most remaining energy after the sample is provided as the source node of the sample, $\delta_i$ represents the number of samples already provided by the leaf node $S_i$, $\delta_i$ is increased by 1 whenever the leaf node $S_i$ provides a sample, $\delta_i=0$ when the leaf node $S_i$ provides no sample yet, wherein i=1~y, then the values in the $0^{th}$ row of the decision table $D_0$ of the root node $S_0$ are all 0, the root node $S_0$ selects the source node of the $m^{th}$ sample based on $\max\{E_1[\delta_1+1],E_2[\delta_2+1],E_3[\delta_3+1],\ldots,E_y[\delta_y+1]\}$, if the leaf node $S_j$ is selected, then $\delta_j=\delta_j+1$, the other $\delta_i$ having i≠j are not changed, the $m^{th}$ row of the decision table $D_0$ of the root node $S_0$ are respectively filled with each $\delta_k$, k=1,2,...,y, namely, $D_0[m,k]=\delta_k$, and the critical energy is $E_0[m]=\min\{E_1[\delta_1],E_2[\delta_2],E_3[\delta_3],\ldots,E_y[\delta_y]\}$; and
allocating the number of samples to be sensed by the leaf node $S_i$ within the specific time according to the $R^{th}$ row in the decision table $D_0$ by using the root node $S_0$.

15. The sampling rate allocation method according to claim 12, wherein the root node further sends a maximum sampling rate and a minimum sampling rate of each of the leaf nodes, and the number of samples to be sensed by each of the leaf nodes within the specific time has to be between the maximum sampling rate and the minimum sampling rate of the leaf node.

16. The sampling rate allocation method according to claim 15, wherein the process executed by the root node comprises:
determining whether the energy tables sent by the leaf nodes are received by using the root node $S_0$, wherein if the root node $S_0$ does not receive the energy tables, the root node $S_0$ waits until the energy tables sent by the leaf nodes are received;
determining a source node of each sample starting from the $$\left(\sum_{i=1}^{y} x_{l,i}\right)^{th}$$

sample until the $R^{th}$ sample by using the root node $S_0$, wherein $l_i$ represents the minimum sampling rate of the leaf node $S_i$, and the number of samples to be provided by the leaf node $S_i$ is up to the maximum sampling rate $u_i$ of the leaf node $S_i$, the root node $S_0$ selects the leaf node $S_i$ having the most remaining energy after the sample is provided as the source node of the sample, $\delta_i$ represents the number of samples already provided by the leaf node $S_i$, $\delta_i$ is increased by 1 whenever the leaf node $S_i$ provides a sample, $\delta_i=0$ when the leaf node $S_i$ provides no sample yet, wherein i=1~y, then the values in the $0^{th}$ row of the decision table $D_0$ of the root node $S_0$ are all 0, the root node $S_0$ selects the source nodes of the $m^{th}$ based on $\max\{E_1[\delta_1+1],E_2[\delta_2+1],E_3[\delta_3+1],\ldots,E_y[\delta_y+1]\}$, if the leaf node $S_j$ is selected, then $\delta_j=\delta_j+1$, the other $\delta_i$ having i≠j are not changed, the $m^{th}$ row of the decision table $D_0$ of the root node $S_0$ are respectively filled with each $\delta_k$, k=1,2, . . . ,y, namely, $D_0[m,k]=\delta_k$, and the critical energy is $E_0[m]=\min\{E_1[\delta_1],E_2[\delta_2],E_3[\delta_3], \ldots ,E_y[\delta_y]\}$; and allocating the number of samples to be sensed by the leaf node $S_i$ within the specific time according to the $R^{th}$ row of the decision table $D_0$ by using the root node $S_0$.

17. The sampling rate allocation method according to claim 16, wherein the maximum sampling rate and the minimum sampling rate of each of the leaf nodes are determined through a minimum mean deviation method or a weighting method.

18. A sampling rate allocation method, suitable for a wireless sensor network in tree topology, wherein the wireless sensor network comprises a root node, at least one internal node, and a plurality of leaf nodes, the sampling rate allocation method comprising:

sending a total sample number to the internal node and each of the leaf nodes by using the root node, wherein the total number of samples is the number of samples to be sensed by the wireless sensor network within a specific time;

calculating the remaining energy of each of the leaf nodes after the leaf node provides a sample, generating a first calculation result, and uploading the first calculation result to the internal node by using each of the leaf nodes;

generating a second calculation result and a third calculation result based on the first calculation results and uploading the second calculation result and the third calculation result to the root node by using the internal node;

generating a fourth calculation result and a fifth calculation result based on the second calculation result by using the root node;

determining the number of samples to be sent by the internal node to the root node within the specific time according to the fifth calculation result and the total number of samples by using the root node; and determining the number of samples to be sensed by the internal node and the leaf nodes within the specific time according to the number of samples to be sent by the internal node to the root node and the third calculation result by using the internal node.

19. The sampling rate allocation method according to claim 18, wherein the first calculation results are energy tables of the leaf nodes, the second calculation result and the third calculation result are respectively an energy table and a decision table of the internal node, and the fourth calculation result and the fifth calculation result are respectively an energy table and a decision table of the root node, wherein the decision table of the root node records the mapping between the total number of samples and the number of samples to be provided by the internal node to the root node, and the decision table of the internal node records the mapping between the number of samples to be uploaded by the internal node to the root node within the specific time and the number of samples to be sensed by the internal node and the leaf nodes.

20. The sampling rate allocation method according to claim 19, wherein the process executed by each of the leaf nodes comprises:

determining whether the total number of samples R is received from the root node $S_0$ by using the leaf node $S_i$, wherein if the total number of samples R is not received, the leaf node $S_i$ waits until the total number of samples R is received from the root node $S_0$;

beginning to calculate and establish an energy table $E_i$ by using the leaf node $S_i$, wherein the energy table $E_i$ has R+1 rows, each of the rows has a field, the field of the $0^{th}$ row represents the original energy of the leaf node $S_i$, and the field $E_i[j]$ of the $j^{th}$ row (j>0) represents the remaining energy after a $j^{th}$ sample is provided;

sending the energy table $E_i$ to the internal node $S_k$ by using the leaf node $S_i$ after the fields of all the rows in the energy table $E_i$ are calculated; and determining whether the internal node $S_k$ designates the number $x_i$ of samples to be sensed by the leaf nodes within the specific time by using leaf node $S_i$, wherein if the internal node $S_k$ designates the number $x_i$, the leaf node $S_i$ senses and obtains samples according to the number $x_i$ designated by the internal node $S_k$; otherwise, the leaf node $S_i$ waits until the internal node $S_k$ designates the number $x_i$.

21. The sampling rate allocation method according to claim 20, wherein the process executed by the internal node $S_k$ comprises:

determining whether the energy tables sent by all the leaf nodes are received by using the internal node $S_k$, wherein if the energy tables are not received, the internal node $S_k$ waits until the energy tables of all the leaf nodes are received;

determining a source node for each sample until the $R^{th}$ sample by using the internal node $S_k$, wherein the internal node $S_k$ selects the leaf node having the most remaining energy after the sample is provided as the source node of the sample, $\delta_i$ represents the number of sample already provided by the leaf node $S_i$, $\delta_i$ is increased by 1 whenever the leaf node $S_i$ provides a sample, $\delta_i=0$ when the leaf node $S_i$ provides no sample yet, wherein i=1~y, then the values in the $0^{th}$ row of the decision table $D_k$ of the internal node $S_k$ are all 0, the internal node $S_k$ determines the source node of the $m^{th}$ sample based on $\max\{E_1[\delta_1+1],E_2[\delta_2+1],E_3[\delta_3+1], \ldots ,E_y[\delta_y+1]\}$, if the leaf node $S_j$ is selected, then $\delta_j=\delta_j+1$, the other $\delta_i$ having i≠j are not changed, the $m^{th}$ row of the decision table $D_k$ of the root node are respectively filled with each $\delta_i$, i=1,2, . . . ,y, namely, $D_k[m,i]=\delta_i$, and the critical energy is $E_k[m]=\min\{E_1[\delta_1],E_2[\delta_2],E_3[\delta_3], \ldots ,E_y[\delta_y]\}$;

determining whether the internal node $S_k$ can take samples and accordingly correcting the energy table $E_k$ or the decision table $D_k$ of the root node by using the internal node $S_k$; and uploading the energy table $E_k$ and the decision table $D_k$ to the root node $S_0$ by using the internal node $S_k$;

determining whether the number of samples to be provided by the internal node $S_k$ to the root node $S_0$ in the specific time is received by using the internal node $S_k$, wherein if the samples are not received, the internal node $S_k$ waits until the number of samples to be provided by the internal node $S_k$ to the root node $S_0$ in the specific time is received; and allocating the number of samples to be sensed by the leaf node $S_i$ and the internal node $S_k$ within the specific time by according to the $u^{th}$ row in the decision table $D_k$ by using the internal node $S_k$, wherein u is the number of samples allocated by the root node to the internal node $S_k$.

22. The sampling rate allocation method according to claim 21, wherein the process executed by the root node comprises:

determining whether the energy table sent by the internal node $S_k$ is received by using the root node $S_0$, wherein if the energy table sent by the internal node $S_k$ is not received, the root node $S_0$ waits until the energy table sent by the internal node $S_k$ is received;

determining a source node for each sample until the $R^{th}$ sample by using the root node $S_0$, wherein the root node $S_0$ selects the internal node $S_k$ having the most remaining energy after the sample is provided as the source node of the sample, $\delta_k$ represents the number of samples already provided by the internal node $S_k$, $\delta_k$ is increased by 1 whenever the internal node $S_k$ provides a sample, $\delta_k=0$ when the internal node $S_k$ provides no sample yet, wherein k=1~y, then the values in the $0^{th}$ row of the decision table $D_0$ of the root node $S_0$ are all 0, the root node $S_0$ determines the source node of the $m^{th}$ sample based on $\max\{E_1[(\delta_1+1], E_2[\delta_2+1], E_3[\delta_3+1], \ldots, E_y[\delta_y+1]\}$, if the internal node $S_x$ is selected, then $\delta_x=\delta_x+1$, the other $\delta_k$ having k≠x are not changed, the $m^{th}$ row in the decision table $D_0$ of the root node $S_0$ are respectively filled with each $\delta_k$, k=1,2, . . . ,y, namely, $D_0[m,k]=\delta_k$, and the critical energy is $E_0[m]=\min\{E_1[\delta_1], E_2[\delta_2], E_3[\delta_3], \ldots, E_y[\delta_y]\}$; and allocating the number of samples to be provided by the internal node $S_k$ to the root node $S_0$ within the specific time according to the $R^{th}$ row in the decision table $D_0$ by using the root node $S_0$.

23. The sampling rate allocation method according to claim 22, wherein the step of determining whether the internal node $S_k$ can take samples and accordingly correcting the energy table $E_k$ or the decision table $D_k$ of the internal node $S_k$ by using the internal node $S_k$ comprises:

using a virtual node $S_c$ to represent all the leaf nodes, the energy table $E_c$ of the virtual node $S_c$ is the energy table $E_k$ of the internal node $S_k$, the decision table $D_c$ of the virtual node $S_c$ is the energy table $E_k$ of the internal node $S_k$;

determining whether each sample should be sensed by the internal node $S_k$ or provided by the virtual node $S_c$ by using the internal node $S_k$ if the internal node $S_k$ can take samples, wherein when m samples are provided, the internal node $S_k$ providing 0 sample and the virtual node $S_c$ providing m samples until the internal node $S_k$ providing m samples and the virtual node $S_c$ providing 0 sample have to be checked, and a combination which allows the critical energy to have the maximum value is selected, and the decision table $D_k$ and the energy table $E_k$ are then corrected according to the energy of the internal node $S_k$; and setting the $0^{th}$ field in each row of the decision table $D_k$ as 0 and correcting the energy table $E_k$ according to the energy of the internal node $S_k$ if the internal node $S_k$ cannot sense and obtain samples.

24. The sampling rate allocation method according to claim 19, wherein the root node further sends a maximum sampling rate and a minimum sampling rate of the internal node and a maximum sampling rate and a minimum sampling rate of each of the leaf nodes, the number of samples to be sensed by the internal node within the specific time has to be between the maximum sampling rate and the minimum sampling rate of the internal node, and the number of samples to be sensed by each of the leaf nodes within the specific time has to be between the maximum sampling rate and the minimum sampling rate of the leaf node.

25. The sampling rate allocation method according to claim 24, wherein the process executed by the internal node comprises:

determining whether the energy tables sent by all the leaf nodes are received by using the internal node $S_k$, wherein if the energy tables are not received, the internal node $S_k$ waits until all the energy tables sent by all of the leaf nodes are received;

determining a source node for each sample starting from the $$\left(\sum_{i=1}^{y} x_{l,i}\right)^{th}$$

sample to the $R^{th}$ sample by using the internal node $S_k$, wherein $l_i$ represents the minimum sampling rate of the leaf node $S_i$, and the number of samples provided by the leaf node $S_i$ is up to the maximum sampling rate $u_i$ of the leaf node $S_i$, R represents the total number of samples, the internal node $S_k$ selects the leaf node having the most remaining energy after the sample is provided as the source node of the sample, $\delta_i$ represents the number of samples already provided by the leaf node $S_i$, $\delta_i$ is increased by 1 whenever the leaf node $S_i$ provides a sample, $\delta_i=0$ when the leaf node $S_i$ provides no sample yet, wherein i=1~y, then the values in the $0^{th}$ row of the decision table $D_k$ of the internal node $S_k$ are all 0, the internal node $S_k$ determines the source node of the $m^{th}$ sample based on $\max\{E_1[\delta_1+1], E_2[\delta_2+1], E_3[\delta_3+1], \ldots, E_y[\delta_y+1]\}$, if the leaf node $S_j$ is selected, then $\delta_j=\delta_j+1$, the other $\delta_i$ having i≠j are not changed, the $m^{th}$ row in the decision table $D_k$ of the root node are respectively filled with each $\delta_i$, i=1,2, . . . ,y, namely, $D_k[m,i]=\delta_i$, and the critical energy is $E_k[m]=\min\{E_1[\delta_1], E_2[\delta_2], E_3[\delta_3], \ldots, E_y[\delta_y]\}$;

determining whether the internal node $S_k$ can take samples and accordingly correcting the energy table $E_k$ or the decision table $D_k$ of the internal node $S_k$ by using the internal node $S_k$; and uploading the energy table $E_k$ and the decision table $D_k$ to the root node $S_0$ by using the internal node $S_k$;

determining whether the number of samples to be provided by the internal node $S_k$ to the root node $S_0$ in the specific time is received by using the internal node $S_k$, wherein if the samples are not received, the internal node $S_k$ waits until the number of samples to be provided by the internal node $S_k$ to the root node $S_0$ in the specific time is received; and allocating the number of samples to be sensed by the leaf node $S_i$ and the internal node $S_k$ within the specific time according to the $u^{th}$ row in the decision table $D_k$ by using the internal node $S_k$, wherein u is the number of samples allocated by the root node to the internal node $S_k$.

26. The sampling rate allocation method according to claim 25, wherein the process executed by the root node comprises:

determining whether the energy table sent by the internal node $S_k$ is received by using the root node $S_0$, wherein if the energy table is not received, the root node $S_0$ waits until the energy table sent by the internal node $S_k$ is received;

determining a source node for each sample from the $$\left(\sum_{i=1}^{y} x_{l,i}\right)^{th}$$

sample to the $R^{th}$ sample by using the root node $S_0$, wherein $x_{l,k}$ represents the minimum sampling rate of the internal node $S_k$, and the number of samples provided by the internal node $S_k$ is up to the maximum sampling rate of the internal node $S_k$, the root node $S_0$ selects the internal node $S_k$ having the most remaining energy after the sample is provided as the source node of the sample, $\delta_k$ represents the number of samples already provided by the internal node $S_k$, $\delta_k$ is increased by 1 whenever the internal node $S_k$ provides a sample, $\delta_k=0$ when the internal node $S_k$ provides no sample yet, wherein k=1~y, then the values in the $0^{th}$ row of the decision table $D_0$ of the root node are all 0, the root node $S_0$ determines the source node of the $m^{th}$ sample based on max$\{E_1[\delta_1+1],E_2[\delta_2+1],E_3[\delta_3+1],\ldots,E_y[\delta_y+1]\}$, if the internal node $S_x$ is selected, then $\delta_x=\delta_x+1$, the other $\delta_k$ having k≠x are not changed, the $m^{th}$ row in the decision table $D_0$ of the root node $S_0$ are respectively filled with each $\delta_k$, k=1,2,\ldots,y, namely, $D_0[m,k]=\delta_k$, and the critical energy is $E_0[m]=\min\{E_1[\delta_1],E_2[\delta_2],E_3[\delta_3],\ldots,E_y[\delta_y]\}$; and allocating the number of samples to be provided by the internal node $S_k$ to the root node $S_0$ within the specific time according to the $R^{th}$ row in the decision table $D_0$ by using the root node $S_0$.

27. The sampling rate allocation method according to claim 24, wherein the maximum sampling rate and the minimum sampling rate of the internal node and the maximum sampling rate and the minimum sampling of each of the leaf nodes are determined through a minimum mean deviation method or a weighting method.

* * * * *